April 17, 1945.   P. R. POWELL   2,374,131
CONVEYER STRUCTURE
Filed Sept. 12, 1941   6 Sheets-Sheet 4

Inventor:
Paul R. Powell,
By Cushman, Darby & Cushman
Attorneys

Patented Apr. 17, 1945

2,374,131

UNITED STATES PATENT OFFICE 2,374,131

CONVEYER STRUCTURE

Paul R. Powell, Baltimore, Md., assignor to Crown Cork & Seal Company, Inc., Baltimore, Md., a corporation of New York Application September 12, 1941, Serial No. 410,641

6 Claims. (Cl. 198—162)

The present invention relates to a conveyer structure and, more particularly, to a structure adapted to clamp articles such as containers in a fixed position upon a conveyer while they are moving past a mechanism which performs operations upon the articles, for example, a labeling mechanism.

An important object of the invention is to provide a mechanism for holding articles against tilting movement with respect to a conveyer without interfering with the advancing movement of the article or its delivery and removal with respect to the conveyer.

In applying labels to containers, or in performing other operations upon various articles, it is desirable to support the articles upon a moving conveyer while the operation is being performed, since the movement of the articles through the apparatus can thereby be expedited. However, if the operation is performed upon the side of the article, the latter may be upset unless it is properly supported at the opposite or rear side.

It has heretofore been proposed to brace or support articles during such operations upon a conveyer by placing a fixed plate at the rear side of the conveyer so that backward or tilting movement of the article will be prevented. However, this results in a drag upon the articles which may cause them to upset and which may also damage them. Furthermore, such an arrangement is not at all practical with circular articles such as bottles because their contact with the fixed plate while moving with the conveyer may cause them to roll and this interferes with label applying and other operations.

Another expedient has been to provide the supporting conveyer with pocketed elements which will substantially enclose the articles. However, such arrangements interfere with labeling and other operations requiring that a substantial area of the article be exposed and clear.

A further object of the invention is the provision of a container supporting arrangement which is of such design that it will not interfere with the labeling of containers or other articles.

By the present invention, the article simply stands upon a conveyer for movement and is gripped upon its top by a clamping element which leaves the entire circumference of the article clear.

Other objects and advantages of the invention will be apparent from the accompanying drawings wherein—

Figure 2:
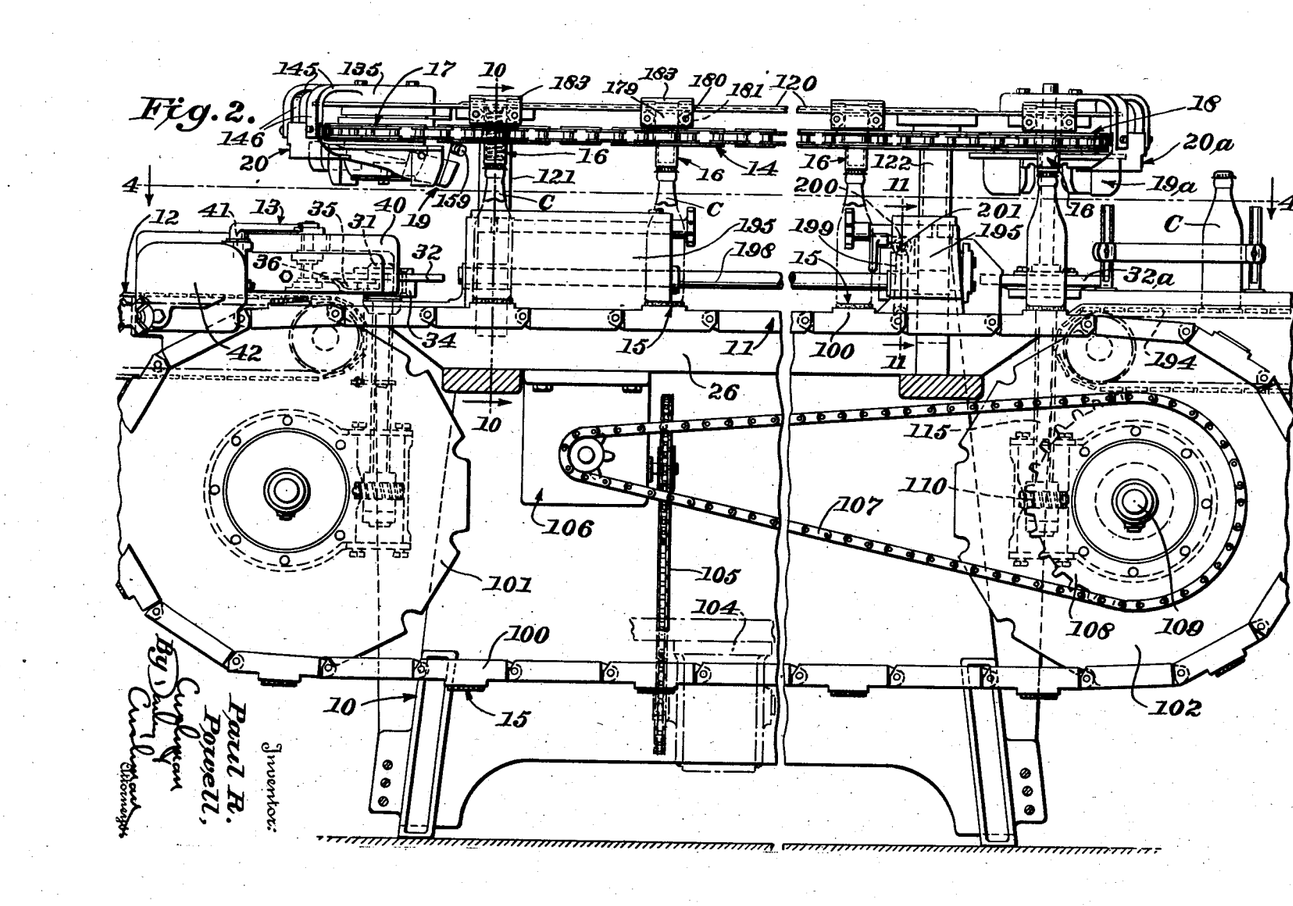
Figure 2 is a vertical longitudinal sectional view on the line 2—2 of Figure 1.
Figure 3:
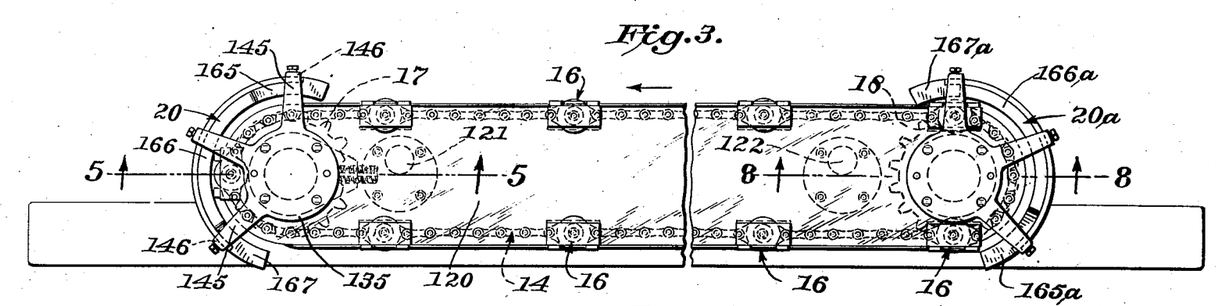
Figure 3 is a plan view showing the upper portion of the conveyer structure of Figure 2.
Figure 4:
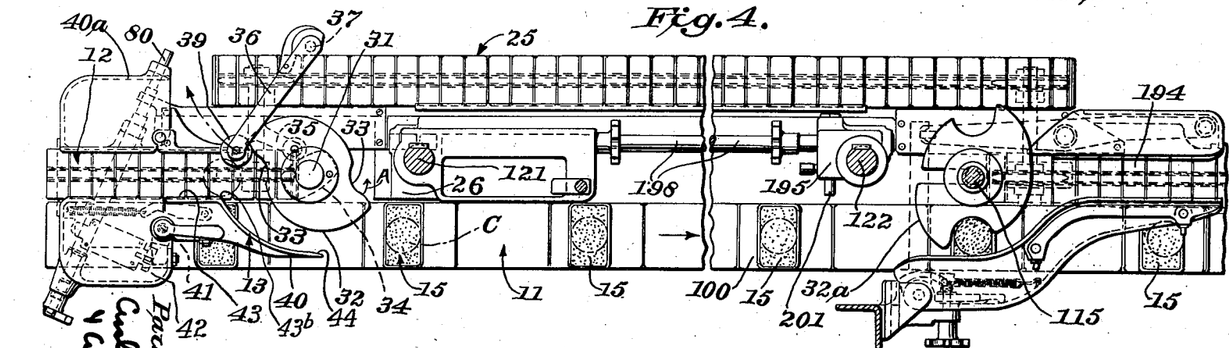
Figure 4 is a horizontal longitudinal sectional view on the line 4—4 of Figure 2.
Figure 5:
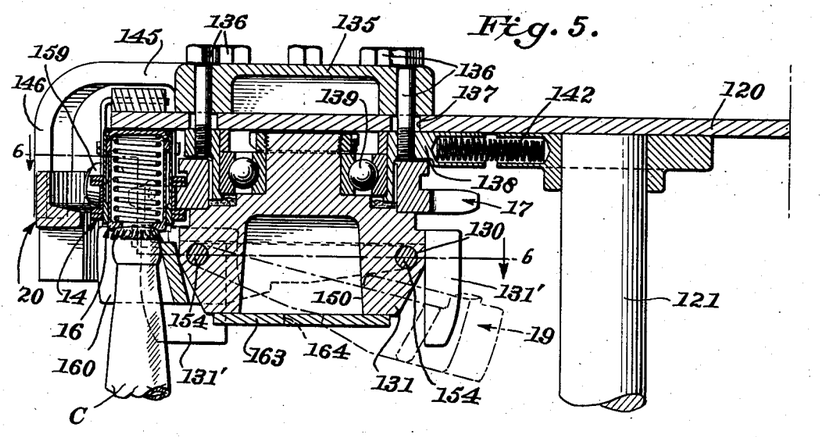
Figure 5 is a longitudinal vertical sectional view on the line 5—5 of Figure 3 and showing the upper portion of the latter figure.

The construction and operation of the present mechanism may be generally described as follows: The numeral 10 generally designates a labeling machine of the type disclosed in my patent for Labeling machine No. 2,284,019, issued May 26, 1942, and which is provided with a container supporting conveyer 11. Containers to be labeled are delivered to the machine 10 upon an infeed conveyer 12 as indicated in Figure 4 and move through a gate mechanism 13 toward the conveyer 11. As best shown in Figure 2, a clamp-carrying chain or endless element 14 is provided above the supporting conveyer 11, element 14 preferably lying in a horizontal plane while supporting conveyer 11 preferably lies in a vertical plane. Supporting conveyer 11 is provided with spaced container supports 15 while, as indicated in Figures 3 and 5, clamp-carrying element 14 includes downwardly urged clamping heads 16 which, as shown in Figure 2, are so spaced that they may move in vertical alignment with the container supports 15.

The chain 14 moves on sprocket wheels 17 and 18, the former (Figures 5 and 6) being at the infeed end of the machine. Sprocket wheel 17 has moving therewith pivoted and vertically swinging clamp lift elements or arms 19 which move with the sprocket wheel and have their vertical position controlled by a fixed arcuate cam track 20 to thereby determine the vertical position of the clamping element 16 which is then moving in alignment therewith. Cam track 20 is of such design that at the time a container is moving onto the supporting conveyer 11 through gate mechanism 13, the clamp 16 generally vertically aligned therewith will be raised, but as soon as the container is standing upon the proper container support 15, the clamp will be permitted to descend to engage the top of the container.

Each clamp 16 will remain lowered while an operation such as labeling is performed upon the article engaged thereby and until the article reaches the outfeed end of the machine, when it will be raised by one of a series of pivoted lifting elements 19a (Figures 8 and 9) associated with the sprocket wheel 18 at the outfeed end of the machine and which elements are controlled by a cam track 20a. After the clamp is lifted, the container or other article will move from the supporting conveyer 11 to a suitable outfeed means.

Labeling apparatus is usually positioned in a production line with a filling machine and it is frequently desired to have some runs of containers moved to the crating point from the filling machine without having labels applied thereto. The present conveyer structure includes a by-pass conveyer 25 (Figure 4) extending parallel with supporting conveyer 11, but beyond the path of the overhead clamp-carrying chain 14, and to which containers may be delivered by the infeed conveyer 12 if it is not desired to apply labels to the containers.

The conveyers 11 and 25 move upon a table structure generally indicated by the numeral 26 and which may form a portion of the labeling apparatus 10 or other operation performing mechanism.

The infeed gate mechanism 13 serves to control the movement of bottles or other articles from the infeed conveyer 12 to the supporting conveyer 11 and to so regulate such movement that the bottles will be placed upon the article supporting elements 15 of the conveyer 11, regardless of the spacing of the bottles upon the infeed conveyer 12.

Referring to Figure 4, the numeral 31 designates a vertical shaft journalled in the table structure 26 of the apparatus directly opposite the inner end of the infeed conveyer 12 as is also indicated in Figure 4. Shaft 31 is continuously rotated and carries a dial 32 which, in the present instance, is provided with two pockets 33 adapted to engage bottles presented by the infeed conveyer 12. Below the dial 32, shaft 31 has fixed thereto a cam 34 which is engaged by a roller at the end of a lateral extension 35 of a pusher or gate arm 36. The gate or pusher arm 36 is pivoted on a vertical pin 37 positioned alongside the outer edge of the by-pass conveyer 25 so that the arm normally extends across the by-pass conveyer as shown in Figure 4. A coil spring, not shown, is connected to arm 36 to urge it to the right in Figure 4, the direction in which it will move bottles, and also holds a roller at the inner end of its projection 35 in engagement with the cam 34. A roller 39 is journalled at the inner and free end of arm 36.

Infeed dial 32 rotates in a counter-clockwise direction as indicated by the arrow A in Figure 4, and the design of cam 34 is such that during the rotation of the dial and just prior to the time that a pocket 33 reaches the position illustrated in Figure 4, the roller 39 of arm 36 will be to the left of the position shown in Figure 4 so as to momentarily provide a clear path of movement for the container. Then, as the bottle passes, arm 36 will swing to the right toward the position illustrated in Figure 4 to urge the bottle (moving with conveyer 12) toward the moving dial pocket and also to come between that bottle or other container and any succeeding container. Thus, the arm 36 will serve to urge the first container into a proper position in the dial pocket. Pusher arm 36 cooperates with a guide arm 40 in this operation. Arm 36 will also urge the container in the direction in which the dial is to move it.

After the above movement, arm 36 will be swung back to position 39a by a rise on cam 34 to enable the succeeding container to be moved toward the next dial pocket at the proper instant.

In order that a container moving with the dial 32 will be retained in a dial pocket and moved along an arcuate path, the guide arm 40 is arranged alongside of and opposite the dial 32. Arm 40 is pivoted on a pin 41, the pin being fixed in a housing 42 positioned alongside the path of infeed conveyer 12. It will be observed that the pivot point of guide arm 40 is at the extreme left hand portion of the arm and that the arm furthermore includes a straight vertical face 43 which leads to the arcuate portion 44 of the guide arm.

The operation of the guide arm 40 in cooperation with pusher arm 36 is as follows:

A container moving on infeed conveyer 12 and roller 39 of pusher arm 36 may come into the relative positions shown in Figure 4. In this position the diameter of the bottle will extend directly between the corner 43b of guide arm 40 and the axis of roller 39. Hence, the right-hand swinging movement of arm 39 will urge the bottle directly toward corner 43b instead of sweeping it into the pocket of dial 32. However, because guide arm 40 is pivoted, it will swing in a clockwise direction in Figure 4 so that the bottle will ride along the arm 40 and into a dial pocket.

It will be noted from the above that pusher arm 36 and guide arm 40 co-act to direct bottles into dial 32 and that pusher arm 36, by its inward movement, also acts as a means to hold back following bottles. That is, because guide arm 40 is mounted for swinging movement to enable bottles to move obliquely and forwardly under direct inward pressure of pusher arm 36, it will be almost impossible for bottles to become jammed.

In the event bottles are not to be operated upon by the apparatus 10, the pusher arm 36 may be disconnected and replaced by elements to divert articles to by-pass conveyer 25.

Figures 7, 8:
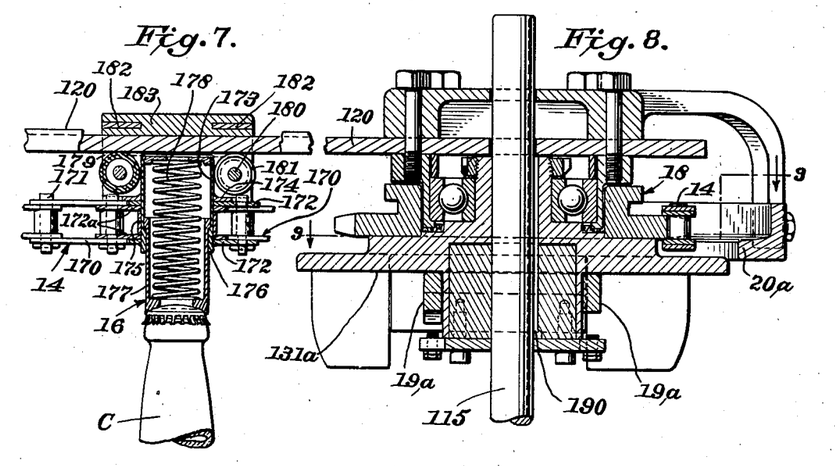
Figure 7 is a vertical sectional view of a clamping head used on the upper or clamping element.
Figure 8 is a detail view on the line 8—8 of Figure 3.

As shown in Figure 7, the housing 42 and opposed housing 40a which serve to guide articles on conveyer 12 may have their relative positions adjusted to handle articles of different sizes by operation of a shaft 80.

Figure 10:
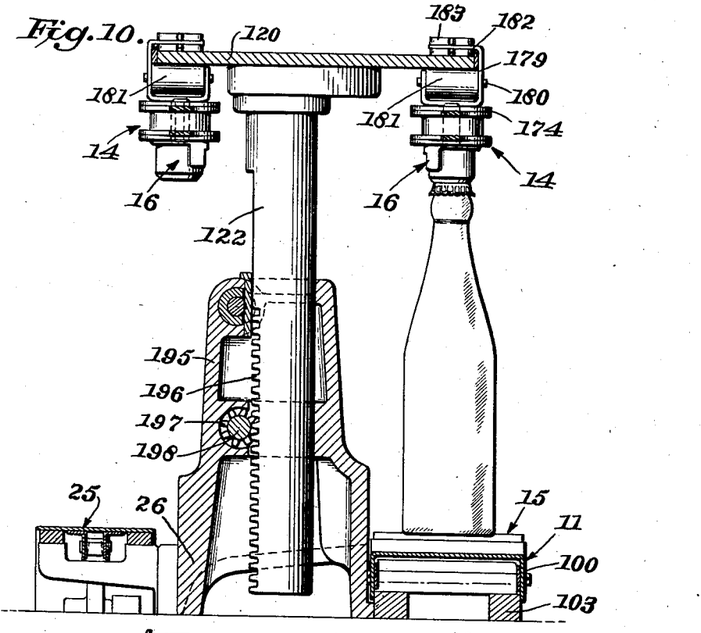
Figure 10 is a transverse vertical sectional view on the line 10—10 of Figure 2.

The supporting conveyer 11 is formed of a series of pivotally connected links 100 which are of U-shaped form in transverse section as best shown in Figure 10 so that the upper run of the conveyer 11 will be skirted to prevent broken glass or other foreign matter from reaching the link pivots or getting between the conveyer and its supporting trackway 103 on table 26. Spaced links 100 are provided with the container or article supporting elements 16 preferably formed of resilient material.

Referring to Figure 2, the supporting conveyer 11 moves upon spaced sprocket drums 101 and 102, the former being at the infeed end of the machine.

Figure 1:
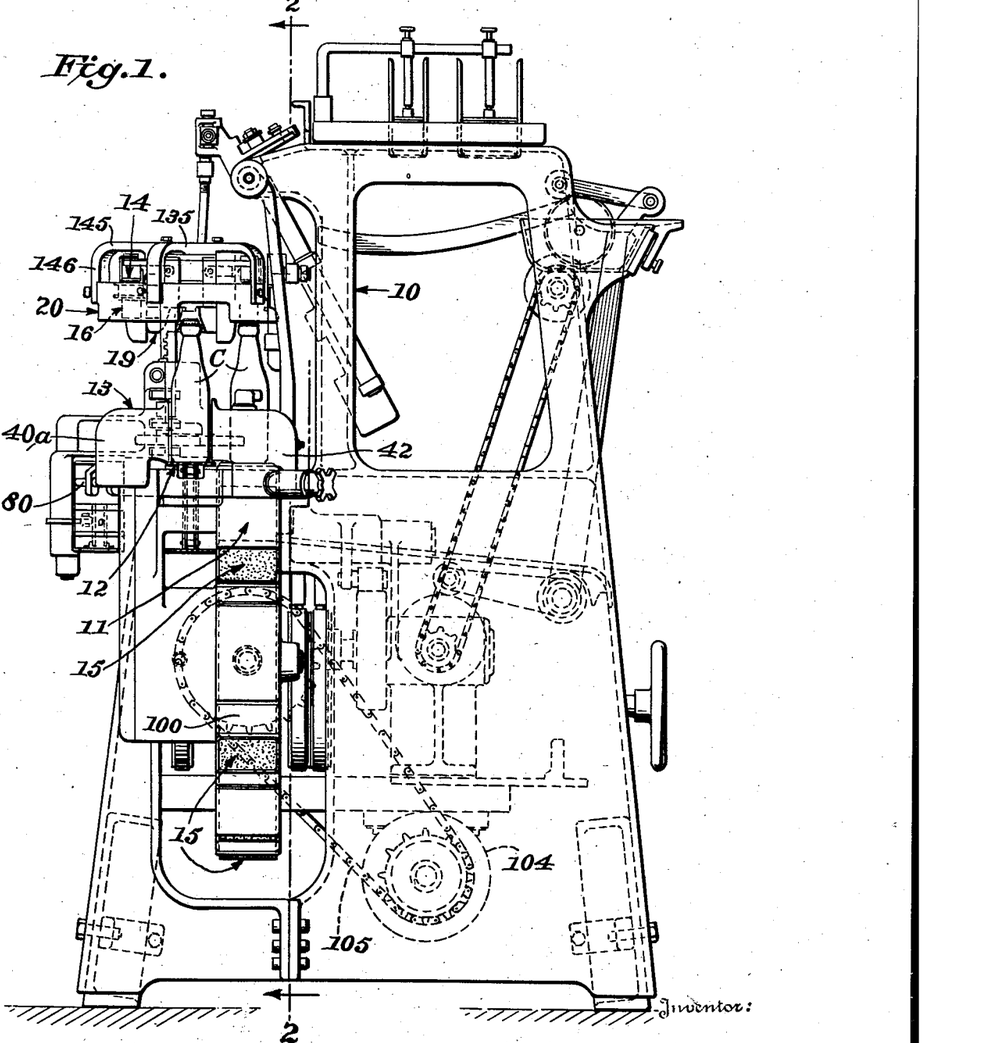
Figure 1 is an elevation of the infeed end of a labeling machine provided with the conveyer mechanism of the present invention.

Referring to Figures 1 and 2, a motor 104 mounted in the base of the machine acts through a belt or chain 105 to drive a reduction unit 106. Unit 106, by a sprocket chain 107 extending longitudinally of the machine, drives a sprocket wheel 108 fixed to the shaft 109 which carries the conveyer chain drum 102 at the outfeed end of the machine.

Shaft 109 is also connected by a spiral gear connection 110 to a vertical shaft 115 which extends upwardly through the table of the machine with its upper end extending through a top plate 120 (Figure 2) supported upon posts 121 and 122. Generally speaking, the top plate 120 serves as the guideway or trackway for the clamp-carrying element or chain 14 and therefore, as shown in Figure 3, extends the full length of the apparatus and has its ends rounded to define the path of the chain.

The clamp-carrying element 14 moves upon the sprocket wheels 17 and 18 supported by top plate 120 as respectively indicated in Figures 5 and 8. As is hereinafter described, the clamp-carrying element 14 as well as the top plate 120 are vertically adjustable with respect to the supporting conveyer 11 so that bottles or other articles of different sizes may be handled upon the machine. As hereinafter described, the drive shaft 115 for clamp-carrying element 14 has a slidable keyed connection with the chain driving sprocket 18 illustrated in Figure 8.

Figure 11:
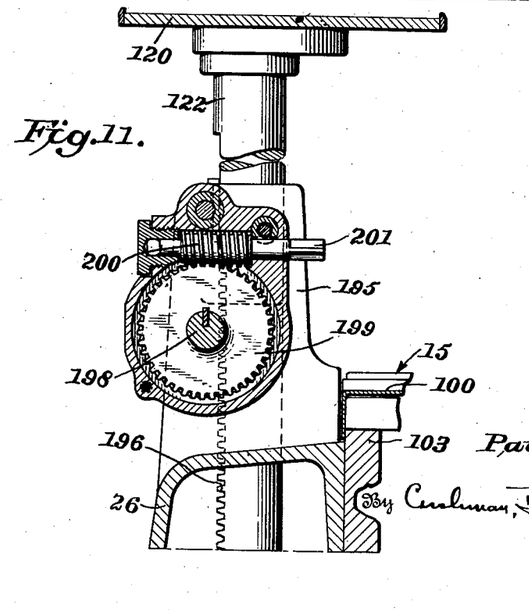
Figure 11 is a detail transverse sectional view on the line 11—11 of Figure 2.

As has been heretofore stated, and as is illustrated in Figures 5 and 11, the clamp-carrying element 14 is provided with spaced clamping elements 16 adapted to bear upon the top of a bottle or other article to hold the latter clamped upon the supporting conveyer 11 and the clamps 16 are raised during their movement about the sprocket wheel 17 at the infeed portion of the machine in order to permit containers to be positioned beneath the clamps. This raising of the clamps 16 is generally accomplished by means of lift elements 19 best shown in Figures 5 and 6 and which are pivoted at 130 in a horizontal plane to a casting or rotary element 131 associated with the sprocket wheel 17. The position of the lift elements 19 is controlled by the stationary cam track 20 extending about the casting 131.

More particularly, and as shown in Figure 5, the end of top plate 120 adjacent the infeed end of the machine carries a bracket 135 resting upon the top plate, the bracket including bolts 136 which extend through slots 137 in the top plate 120 to support a lower plate member 138 against the underside of the top plate. Lower plate 138 includes a depending flange in which is mounted the outer race of an anti-friction assembly 139 and this assembly, in turn, supports the rotating element or casting 131 to which the sprocket wheel 17 is fixed.

It will be observed from Figure 5 that a pair of springs 142 are positioned beneath the top plate 120 and between the plate element 138 and the adjacent side of supporting post 121. These springs serve to urge the entire assembly including sprocket wheel 17 to the left so as to hold the clamp-carrying element 14 under proper tension.

The upper bracket 135 includes radially extending arms 145 which include downward projections 146 to support the cam track 20.

Figure 6:
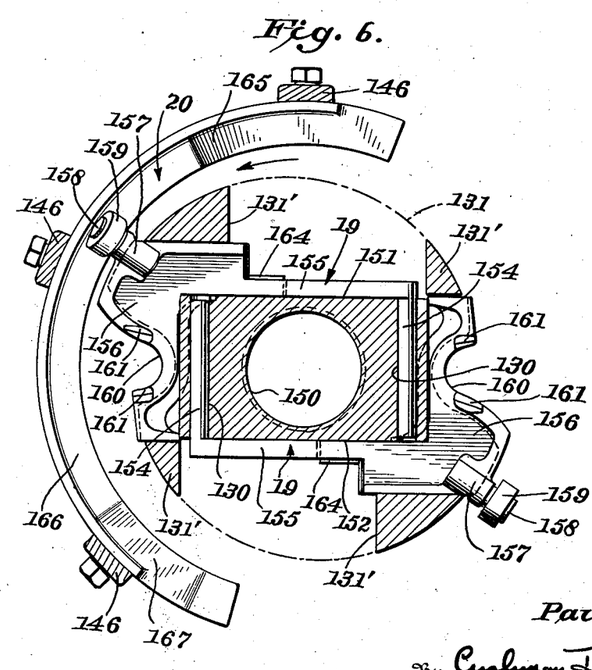
Figure 6 is a horizontal sectional view on the angled line 6—6 of Figure 5, the view omitting certain elements for the purpose of clarity.

The casting or rotary element 131 may be provided with a hollowed portion 150 on its underside merely to decrease its weight. Also, this element is provided with flat vertical faces 151 and 152 extending parallel to each other and also parallel to a diameter of the element. A horizontal bore 130 extends inwardly from one end of the face 151 and toward the other face 152 and this bore receives a pin 154 integral with and forming a pivot for the lift element 19 which extends alongside the face 151. As is best shown in Figure 6, each lift element 19 includes the above mentioned pin 154, a bar portion 155 and a cam and clamp engaging portion 156 all so arranged that each element 19 is generally of U-shaped form with the pin 154 and portion 156 forming the legs of the U while the bar 155 forms the bight. The portion 156 is of some thickness in a vertical plane and is provided with an upstanding horizontal boss 157 having a bore therethrough in which a pin 158 is mounted. Pin 158 carries a roller 159 to engage cam track 20. Portion 156 is also provided with a laterally open recess 160 to receive and center a bottle neck and has upwardly facing shoulders 161 at the upper edge of the recess 160 which are adapted to engage a clamp element 16 at diametrically opposite points so as to hold the latter upwardly. These shoulders 161 are therefore arranged on the pitch diameter of the clamping chain 14.

It will be noted that the lift elements 19 swing in a vertical plane with the pin 154 as a pivot. The downward movement of each clamp element is limited by a bottom plate 163 secured to the underside of the rotary element 131. Plate 163 includes projections 164 upon which the lower edge of an element 19 will rest when it is free of cam 20 as indicated in dotted lines at the lower right hand portion of Figure 5.

The casting 131 includes downward projections such as 131' including vertical faces to guide the lifts 19 in their swinging movement and prevent them from moving laterally.

The mounting of the other lift element 19 of Figure 6 will be apparent from the above description given in connection with Figures 5 and 6. It will be understood that during the movement of the clamp-carrying element or chain 14 about the sprocket wheel 17 and the simultaneous rotation of the rotary element 131 with the sprocket wheel, a lift element 19 will come in contact with each clamp 16 of the chain 14 so as to lift the latter to a position slightly above that shown in Figure 5, this lifting being controlled by the cam 20 which includes an upwardly inclined portion 165 with which the roller 159 of a lift element will contact during rotation in the direction of the arrow of Figure 6 and while the shoulders 161 of the lift element are beneath a clamp 16. When the roller 159 moves upon the rise 166 of cam 20, the shoulders 161 will contact with the clamp 16 to raise the same above the height of the bottles or other articles to be handled. During the time that element 16 is thus raised, a container or bottle will be positioned beneath the same by the gate device of Figure 4 or by corresponding means. After the bottle has been positioned in vertical alignment with the clamp 16, the roller 159 will move off the rise 166 and along the downwardly inclined surface 167 of cam 20 so that the clamp 16 may descend to engage the top of the bottle. The clamp with the bottle will then move in a straight line with clamp-carrying element 14 and supporting conveyer 11 while the lift element 19 will move in a rotary path and hence away from the clamp 16 as indicated in Figure 6.

As best shown in Figure 7, each clamp 16 is so mounted upon the clamp-carrying element that it will serve as a pivot for two adjacent links of the chain. More particularly, chain 14 is primarily composed of links 170 connected by pins 171. The pin 171 at one side of a clamp 16 is provided with a pair of links 172 which are somewhat longer and larger than the links 170 of the normal chain and pivotally extend about the cylindrical body element 173 of the clamp 16. The pin 171 at the opposite side of a clamp 16 carries similar links 172a which extend between the links 172 and also pivotally engage cylindrical element 173. Thus each element 173 serves as a pivot in the chain. A plate element 174 bears upon the uppermost link 172 and is welded to body element 173. A spacing collar 175 is provided between the links 172a.

The body elements 173 are of cylindrical form as stated above and the sprocket wheels 17 and 18 are provided with recesses spaced along their teeth to receive the same. The wall of each body element 173 is thickened at its lower end to provide a shoulder 176 to serve as a stop for a clamp sleeve 177 which is urged to a downward position by a coil spring 178.

As shown in Figure 10, each plate element 174 of a clamp 16 includes vertically extending tongues 179 which have horizontally extending pins 180 (see also Figure 7) extending between them which serve as journals for rollers 181 which bear upon the underside of the top plate 120 so as to hold the chain 14 against lifting movement. The outer vertical tongue 179 includes an upper horizontal portion 182 which carries a block 183 to bear on the upper surface of top plate 120 so as to limit the downward movement of chain 14.

Figure 9:
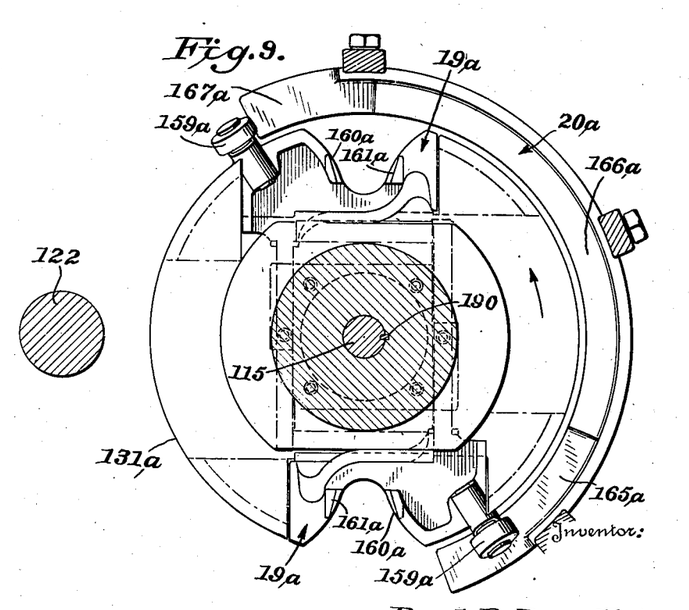
Figure 9 is a horizontal sectional view on the line 9—9 of Figure 8.

Figures 8 and 9 show the structure of the sprocket wheel 18 at the outfeed end of the apparatus as well as the elements associated therewith. This structure is identical with that illustrated in Figures 6 and 7 except that the lift elements 19a at the outfeed end are so arranged that the rollers 159a which engage the outfeed cam 20a are in advance of the clamp engaging recesses 160a. Cam 20a is provided with an upwardly inclined portion 165a, which the rollers 159a engage after the shoulders 161a are in alignment with a clamp 16, continued rotation of the sprocket wheel 18 causing the roller 159a to move upon the rise 166a to lift the clamp entirely out of engagement with the bottle or other article so that the latter may be moved from the supporting conveyer 11. The roller 159a then moves down the decline 167a and out of engagement with the clamp which is then free to descend. However, it will be understood that during the return movement of a clamp 16 along the outer side of top plate 120, it will be held in the proper horizontal position by its engagement with the top plate.

The structure shown in Figures 8 and 9 further differs from that of Figures 6 and 7 in that the rotary element or casting 131a at the outfeed end of the apparatus includes a key element 190 which is secured to the rotary element and is keyed to the chain driving shaft 115. Also, the rotary element 131a is apertured so that the shaft 115 may extend up through the same as well as through an aperture in the top plate 120. The key connection to shaft 115 permits the entire top plate 120 together with all of the elements supported thereby to be moved vertically with respect to the shaft 115 as well as the lower elements of the apparatus so that the machine may handle containers or other articles of various heights.

The top plate 120 and clamp-carrying chain 14 are vertically adjusted by means of the structure shown in Figures 10 and 11. Referring to these figures, it will be observed that top plate supporting posts 121 and 122 are mounted in bosses 195 extending upwardly from the table 26 of the apparatus and that the lower portion of each post is provided with rack teeth 196 which are engaged by pinions 197 carried on a shaft 198 extending horizontally of table 26 and between the bosses 195 as shown in Figure 2. The shaft 198 also carries a worm wheel 199 which engages a worm 200 carried by a transverse shaft 201. The outer end of the shaft 201 is squared to receive an operating handle and serves to simultaneously raise both posts 121 and 122.

It will be understood that containers may be moved from the supporting conveyer 11 by an outfeed dial 32a and placed upon an outfeed conveyer 194 for removal from the apparatus.

The operation of the entire apparatus has been described in the opening portion of this description and the operation of the various elements has been set forth in connection with the description of the structure of such elements.

The terminology used in the specification is for the purpose of description and not of limitation, the scope of the invention being indicated in the claims.

I claim:

1. In a conveyer structure, a base, an article supporting conveyer movable on said base, a pair of horizontally arranged rotary wheels journalled to be spaced above said conveyer, said wheels being horizontally spaced along said conveyer, an endless element movable about said wheels, vertically movable article clamping members mounted on said endless element, a lever element pivoted on each of said wheels for vertical swinging movement with respect to the latter and adapted to engage said article clamping members to control the vertical position of the latter, and means to control the vertical positions of said lever elements.

2. A conveyer structure of the character described in claim 1 wherein the means to control the vertical positions of said lever elements comprises a fixed cam partially surrounding each of said wheels.

3. In a conveyer structure, a supporting conveyer, a pair of horizontally arranged and horizontally spaced rotary members positioned above said supporting conveyer, an endless element movable in a horizontal plane about said rotary members, plate elements carried on said endless element, article clamping members carried by each of said plate elements for vertical movement with respect to the latter and spring-urged downwardly toward said conveyer, vertically movable members pivotally carried by said rotary members and adapted to move upwardly to engage and lift said article clamping members, and a fixed cam track adjacent each of said rotary members to control the vertical position of said vertically movable members.

4. In a conveyer structure, a supporting conveyer, a pair of horizontally arranged and horizontally spaced rotary members positioned above said supporting conveyer, an endless element movable in a horizontal plane about said rotary members, plate elements carried on said endless element, article clamping members carried by each of said plate elements for vertical movement with respect to the latter and spring-urged downwardly toward said conveyer, vertically movable members pivotally carried by said rotary members and adapted to move upwardly to engage and lift said article clamping members, a fixed cam track adjacent each of said rotary members to control the vertical position of said vertically movable members, and fixed means to hold said endless element in a horizontal plane.

5. In a conveyer structure, an article supporting conveyer, an endless element spaced above said conveyer, article clamping means spaced along said endless element and capable of limited movement toward and away from said conveyer, and means to control the position of said article clamping means comprising a rotatable member in operative engagement with said endless element, a lift member including two legs carried by said rotatable member, one of the legs of said lift member being pivotally connected to said rotatable member to serve as a pivot for said lift member, and a fixed cam track adjacent said rotatable member adapted to be engaged by the other leg of said lift member, said last-mentioned leg being provided with means to engage said article clamping means to control the position of the latter with respect to said conveyer.

6. In a conveyer structure, a base, an article supporting conveyer movable on said base, a pair of rotatable members journalled at points spaced along said conveyer, an endless element trained about said members and movable in a horizontal plane above said conveyer, vertically movable article clamping devices mounted on said endless element, an element carried by and movable on each of said rotatable members and adapted to engage said article clamping members to control the vertical position of the latter, and means to control the position of said last-named elements.

PAUL R. POWELL.